United States Patent [19]

Cruise

[11] E Patent Number: Re. 32,866

[45] Reissued Date of Patent: Feb. 14, 1989

[54] METHOD AND APPARATUS FOR DISTRIBUTING FLUIDS WITHIN A SUBTERRANEAN WELLBORE

[75] Inventor: Don S. Cruise, Buras, La.

[73] Assignee: Chevron Research Company, San Francisco, Calif.

[21] Appl. No.: 936,537

[22] Filed: Nov. 26, 1986

Related U.S. Patent Documents

Reissue of:

[64] Patent No.: 4,580,634
Issued: Apr. 8, 1986
Appl. No.: 591,626
Filed: Mar. 20, 1984

[51] Int. Cl.[4] ..... E21B 37/06

[52] U.S. Cl. ..... 166/310; 166/105; 166/312; 166/371

[58] Field of Search ..... 166/68, 68.5, 105–112, 166/244 C, 371, 279, 310, 312, 304, 300, 311, 101, 183, 54, 72

[56] References Cited

U.S. PATENT DOCUMENTS

| | | | |
|---|---|---|---|
| 2,214,064 | 9/1940 | Niles | 166/54 |
| 2,551,434 | 5/1951 | Gray et al. | 166/72 |
| 2,808,111 | 10/1957 | Krueger | 166/101 |
| 3,108,635 | 10/1963 | Chittum | 166/310 X |
| 3,247,902 | 4/1966 | van Poolen | 166/279 |
| 3,335,791 | 8/1967 | Patton | 166/310 |
| 3,361,205 | 1/1968 | Waldron | 166/68 X |
| 3,548,946 | 12/1970 | Engle | 166/310 |
| 3,712,862 | 1/1973 | Bundrant et al. | 166/310 X |
| 3,849,328 | 11/1974 | Schievelbein et al. | 166/279 X |
| 3,901,313 | 8/1975 | Doniguian et al. | 166/64 |
| 4,031,955 | 6/1977 | Ledet | 166/183 |
| 4,266,607 | 5/1981 | Halstead | 166/244 |
| 4,267,888 | 5/1981 | Singer | 166/312 |
| 4,326,585 | 4/1982 | McStravick | 166/244 |
| 4,386,653 | 6/1983 | Drake | 166/105 |
| 4,393,927 | 7/1983 | Singer | 166/105 |
| 4,440,221 | 4/1984 | Taylor et al. | 166/106 |

FOREIGN PATENT DOCUMENTS 3304594 8/1984 Fed. Rep. of Germany .

OTHER PUBLICATIONS

Cruise et al., "Use of Continuous Coil Tubing for Subsurface Scale and Corrosion Treating—Rangely Weber Sand Unit", SPE 11853, Society of Petroleum Engineers of AIME, May 23–25, 1983, Dallas Tex., 6 pages.

*Primary Examiner*—Stephen J. Novosad
*Attorney, Agent, or Firm*—S. R. LaPaglia; E. J. Keeling

[57] ABSTRACT

A method and apparatus for distributing fluids within a subterranean borehole wherein a submersible pump is introduced into the borehole at a first location. An intake port of the pump is connected to the first end of an intake duct having an unconnected second end located at a second location within the wellbore from which location fluid is to be withdrawn. An output port of the pump is connected to a first end of a second duct having an unconnected second end at a third location within the wellbore into which location fluid is to be introduced. By activating the pump, fluids, such as scale and corrosion inhibitors, are distributed from above the intake of a production pump to as low in the borehole as is required to protect wellbore contents.

9 Claims, 1 Drawing Sheet

METHOD AND APPARATUS FOR DISTRIBUTING FLUIDS WITHIN A SUBTERRANEAN WELLBORE

Matter enclosed in heavy brackets [ ] appears in the original patent but forms no part of this reissue specification; matter printed in italics indicates the additions made by reissue.

BACKGROUND OF THE INVENTION

The present invention pertains in general to methods and apparatus for distributing fluids within a subterranean wellbore and in particular to methods and apparatus for distributing scale- or corrosion-inhibiting substances within a wellbore.

Deposition of scale on and corrosion of production equipment within a wellbore are severe problems in a number of oil fields. In some areas, corrosion problems are so great that downhole equipment must be pulled every few weeks for the purpose of replacement of damaged components. Scale buildup may be so severe that downhole submersible pump assemblies become insulated from the production fluid, causing the motor to heat up and fail prematurely. In other instances, scale buildup may be so severe that downhole components become stuck in the hole, so that their removal requires a costly fishing job.

One method of treatment for protecting well components involves continuously flushing scale and corrosion inhibitors down the annulus between production tubing and the well casing. Another protection method involves introducing a packer between the casing and the tubing above the production zone. Above the production zone, the tubing-casing annulus is filled with corrosion-and scale-inhibiting liquid. Neither of these techniques protects the casing or elements of the production tubing string below the point at which wellbore fluids are withdrawn into the production tubing.

Scale and corrosion below the production tubing intake is especially troublesome in deep wells where a downhole submersible pump is used to move production fluids towards the surface. Conventional methods of continuous flushing of scale and corrosion inhibitors or employing a packed-off, scale and corrosion inhibitor-filled annulus offer no protection to the seal and motor commonly found below the pump intake. Thus, frequent pulling of the well may be necessitated at great cost despite the use of scale and corrosion inhibitors.

One approach to scale and corrosion protection below the pump intake involves pumping scale and corrosion inhibitors from the surface down ¾ inch coiled mild steel tubing which follows the production string and which attaches to a fiberglass tailpipe extending from the lower surface of a motor at the end of the production string to below the bottom of the production zone. This technique is successful in protecting downhole components, but is cumbersome, may require field-welding of lengths of tubing, and the tubing itself is subject to corrosion problems.

SUMMARY OF THE INVENTION

Accordingly, the present invention involves apparatus for distributing fluids, particularly corrosion and scale inhibitors, within a subterranean wellbore. The apparatus according to the present invention includes a submersible pump positioned at a first location within the borehole. Means for activating the submersible pump is connected to the pump. An intake port of the submersible pump is connected to the first end of an intake duct which has a second end for withdrawing fluids from a free second location within the borehole. An output port of the submersible pump is connected to a first end of an output duct which has a free second end at a third location within the wellbore.

A method according to the present invention involves distributing fluids within the subterranean wellbore and includes the steps of introducing into the wellbore at a first location apparatus comprising a submersible pump having an intake port connected to a first end of an intake duct and having an output port connected to a first end of an output duct. A free second end of the intake duct is positioned within the wellbore at a second location from which fluid is to be withdrawn. A free second end of the output duct is located within the wellbore at a third location into which fluid is to be introduced. The pump is then activated.

DESCRIPTION OF THE PREFERRED EMBODIMENT

Figure 1:
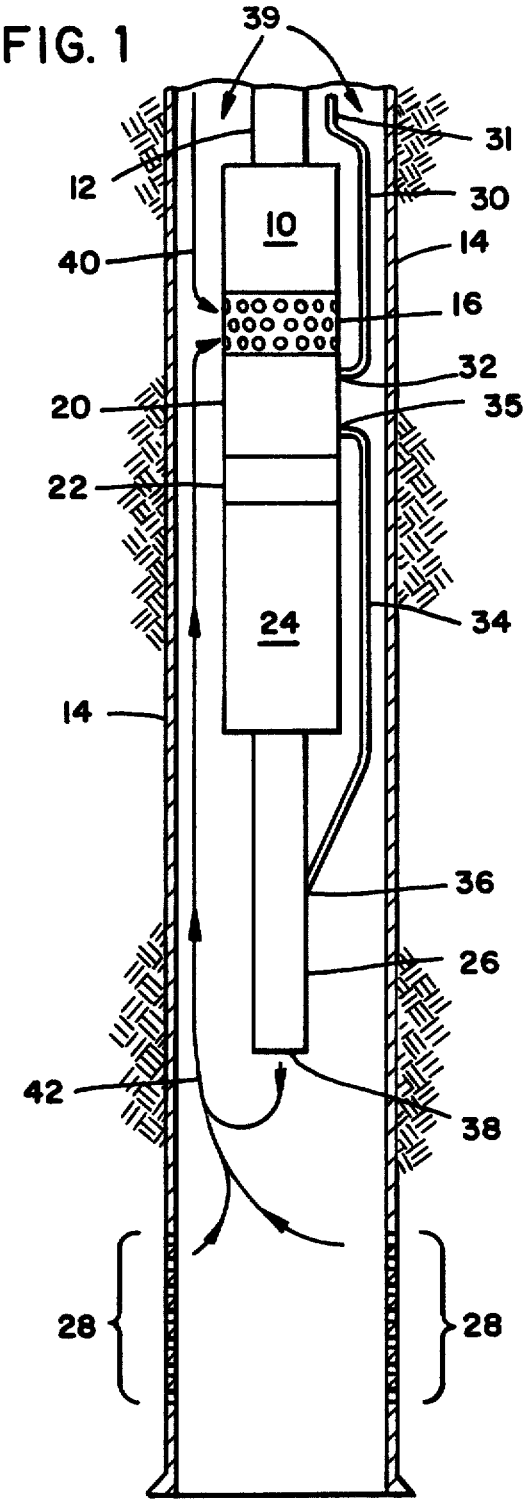
FIG. 1 is a view in partial cross-section of a preferred embodiment of the present invention.
Figure 2:
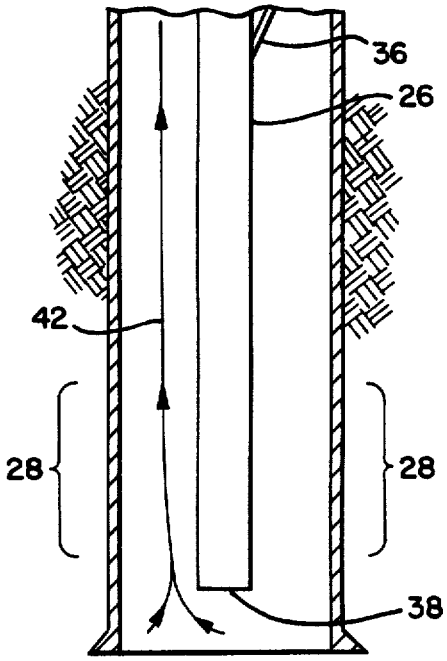
FIG. 2 is a partial cross sectional view illustrating an alternate embodiment of the present invention.

In the Figure, which illustrates the contents of a borehole in the vicinity of a production zone, a submersible production pump 10 has an input 16 and has an output connected to the end of a cylindrical production tubing 12 within well casing 14.

A rotatable connection is provided between pump 10 and an inhibitor pump 20. Inhibitor pump 20 is connected to the top end of a sealed motor 24 by a rotatable shaft (not shown) through a seal 22. The bottom of motor 24 is connected to a first end of a hollow, cylindrical fiberglass stinger assembly 26 which has a free (i.e., unconnected) second end 38 above perforations 28 in casing 14.

A first length of coiled tubing 30 has a first end connected to an intake port 32 of pump 20 and a free second end 31 above the top of pump 10. A second length of coiled tubing 34 has a first end connected to an output port 35 of pump 20 and has a second end joined to tailpipe 26 at a junction 36.

An annulus [38] *39* is formed between production tubing 12 and the elements attached thereto and casing 14. Tubing 30 forms an intake duct having a free end 31 for withdrawing fluids from the reservoir formed by annulus 38 above pump 10. Similarly, tubing 34 in combination with tailpipe 26 having free end 38 forms an output duct for introducing fluids into the reservoir formed by the cavity within casing 14 and below motor 24.

Submersible pumps, such as pumps 10 and 20, are well known and readily available to those skilled in the art. Pump 20 may be a one stage pump readily available to those skilled in the art in the form of a single stage of a commonly available multi-stage pump. However, it is not intended that the present invention be limited to a single stage pump. Seals, shafts and motors are well known and readily available to those skilled in the art and will not be discussed further. Three-quarter inch coiled mild steel tubing suitable for use in the present invention is readily available from a variety of sources, including NOWSCO, Houston, Tex. A fiberglass tailpipe such as stinger assembly 26 is readily manufactured from fiberglass tubing readily available to those skilled in the art.

Scale inhibitor pump 20 may be bolted on in series between pump 10 and seal 22. Pump 20 may have the same diameter shaft as pump 10 and may be stabilized by a top bearing to avoid side play.

Tubing 30 and 34 may be round where the width of annulus [38] *39* permits and may be flattened where the annulus is narrow. Free end 31 may have an attached filter or may merely be plugged and have holes drilled in tubing 30 to provide filtration.

Motor 24 may be electrically powered by means of a cable (not shown) extending from the surface. In the embodiment illustrated in the Figure inhibitor pump 20 is activated whenever motor 24 is operating pump 10.

In the operation of the present invention, scale and corrosion inhibitor fluid is pumped from the surface down annulus 39 as indicated by arrow 40. Upon activation of pump 20, inhibitor is withdrawn from annulus [38] *39* through tubing 30 into intake port 32 of pump 20. The inhibitor fluid is then pumped from output port 35, through tubing 34, past junction 36 and out of tailpipe 26. Fluid forced out of free end 38 of tailpipe 26 by the action of pump 20 is pulled toward pump 10 along with formation fluids passing into casing 14 through perforations 28 as indicated by arrow 42.

Thus, scale and corrosion inhibitor fluids enter intake 16 of pump 10 from the surface and from below (mixed with production fluids). In this way elements of the production string both above and below intake 16 of pump 10 are protected, contrary to the condition found in the prior art.

While the present invention has been described in terms of a preferred embodiment, further modifications and improvements will occur to those skilled in the art. For example, the precise location of pump 20 in relation to pump 10, motor 24, and seal [24] *22* is not critical so that variations in the order of these elements along the production string are intended to come within the scope of the invention as described. Likewise, the illustrated position of the intake and output ports of pump 20 are not meant to be restrictive and as is obvious to one with mechanical skills in the art, these locations may be varied according to the position of the ports on the particular pump used. Similarly, free ends 38 may be positioned below perforations 28 where it is desirable to protect casing 14 around perforations 28 or to promote mixing of fluids prior to entering the pump intake where desirable. Intake and output ducts may be varied in length for the sake of convenience to the extent that they may comprise the rims of or slight extensions of the input and output ports.

Furthermore, it is not intended that the present invention be limited in its use to movement of scale or corrosion inhibitor fluids. In fact, the scale inhibitor pump according to the present invention may be used in wells with gas locking problems, may be used to cool the motor of a low volume submersible pump located below the perforations, and may be used to distribute a wide variety of other treatment fluids and chemicals such as defoamers, emulsion breakers, flocculants, paraffin inhibitors, bactericides, and so forth, from and to various locations within a wellbore.

I desire it to be understood, therefore, that this invention is not limited to the particular form shown and that I intend in the appended claims to cover all such equivalent variations which come within the scope of the invention as claimed.

What is claimed is:

1. Apparatus for distributing fluids around equipment including a production pump to be protected within a subterranean borehole comprising:

a submersible pump being positioned at a first location within the borehole and having an intake port and an output port;

means, connected to said submersible pump, for activating said submersible pump;

an intake duct having a first end connected to said intake port and having a free second end at a second location within the borehole for withdrawing fluid from the second location said second location being on a first side of the equipment to be protected; and an output duct having a first end connected to said output port and having a free second end at a third location within the wellbore for introducing fluids into the third location, said third location being on a second side of the equipment to be protected, said equipment to be protected including a production pump having an intake and wherein said second location is above said intake and wherein said third location is below said intake.

2. The apparatus as recited in claim 1 further comprising a casing having perforations in a production zone and wherein said third location is below said perforations.

3. The apparatus as recited in claim 1 wherein said output duct comprises a tailpipe.

4. The apparatus as recited in claim 1 wherein said pump is a single stage pump.

5. A method for distributing fluids within a subterranean borehole around equipment to be protected comprising the steps of:

introducing into the borehole at a first location apparatus comprising a submersible pump having an intake port connected to a first end of an intake duct and having an output port connected to a first end of an output duct;

positioning a free second end of said intake duct within the borehole at a second location from which fluid is to be withdrawn, the second location being on a first side of the equipment to be protected;

locating a free second end of said output duct within the borehole at a third location into which fluid is to be introduced, the third location being on a second side of the equipment to be protected;

activating said submersible pump; and providing a treatment fluid to said second location, said treatment fluid selected from the group consisting of a corrosion inhibitor, scale inhibitor, a defoamer, an emulsion breaker, a focculant, a paraffin inhibitor, a bactericide and mixtures thereof.

*6. In a well installation, having casing, a string of tubing extending to a downhole centrifugal pumping assembly, defining an annulus between the casing and the tubing and pumping assembly, and means at the surface for introducing inhibiting chemicals into the annulus, the pumping assembly including a centrifugal primary pump driven by an electrical motor located below the pump and separated by a seal section for preventing well fluids from entering the motor, the improvement comprising in combination:*

*a centrifugal secondary pump having an upper end adapted to be connected to the bottom of the primary*

*pump and a lower end adapted to be connected to the top of the seal section;*

*the secondary pump having an intake port on its upper end adapted to be connected to an intake tube that extends above an intake of the primary pump, terminating in the annulus; and*

*the secondary pump having a discharge port on its lower end adapted to be connected to a discharge tube that extends downwardly through the annulus alongside the motor to a point in the annulus below the motor, for pumping inhibiting chemicals drawn from the annulus to a location below the motor, which then flow upwardly around the motor and into the intake of the primary pump.*

*7. Apparatus for introducing inhibiting chemicals into a wellbore comprising:*

*(a) a production pump at a first location in the wellbore;*

*(b) a secondary pump at a second location within the wellbore further comprising:*

*(i) an intake tube; and*

*(ii) a discharge tube;*

*(c) a motor for driving said production pump above discharge tube.*

*8. In a well installation, having casing, a string of tubing extending to a downhole pumping assembly, defining an annulus between the casing and the tubing and pumping assembly, and means at the surface for introducing inhibiting chemicals into the annulus, the pumping assembly including a primary pump driven by an electrical motor located below the pump and separated by a seal section for preventing well fluids from entering the motor, the improvement comprising in combination:*

*a secondary pump having an upper end adapted to be connected to the bottom of the primary pump and a lower end adapted to be connected to the top of the seal section;*

*the secondary pump having an intake pump on its upper end adapted to be connected to an intake tube that extends above an intake of the primary pump, terminating in the annulus; and*

*the secondary pump having a discharge port on its lower end adapted to be connected to a discharge tube that extends downwardly through the annulus alongside the motor to a point in the annulus below the motor, for pumping inhibiting chemicals drawn from the annulus to a location below the motor, which then flow upwardly around the motor and into the intake of the primary pump.*

*9. Apparatus for introducing inhibiting chemicals into a wellbore comprising:*

*(a) casing;*

*(b) tubing within the casing defining an annulus between the tubing and the casing;*

*(c) a pumping assembly substantially at the end of said tubing and further comprising:*

*(i) a primary pump;*

*(ii) an electrical motor for driving said primary pump; and*

*(iii) a seal section between said pump and said motor;*

*(d) a secondary pump having an upper end connected to the bottom of said primary pump and a lower end connected to the top of said seal section and further comprising:*

*(i) an inhibitor intake port connected to an intake tube operably terminating in said annulus; and*

*(ii) a discharge port adapted to be connected to a discharge tube extending downwardly through said annulus alongside said motor to a point in said annulus below said motor.*

* * * * *

UNITED STATES PATENT AND TRADEMARK OFFICE

CERTIFICATE OF CORRECTION

PATENT NO. : Re. 32,866

DATED : February 14, 1989

INVENTOR(S) : Don S. Cruise

It is certified that error appears in the above-identified patent and that said Letters Patent is hereby corrected as shown below:

Claim 8, Col. 6, line 3, "the secondary pump having an intake pump" should read -- the secondary pump having an intake port--

Signed and Sealed this

Twelfth Day of December, 1989

*Attest:*

JEFFREY M. SAMUELS

*Attesting Officer* *Acting Commissioner of Patents and Trademarks*